US009225099B2

(12) United States Patent
Omari et al.

(10) Patent No.: US 9,225,099 B2
(45) Date of Patent: Dec. 29, 2015

(54) SYSTEM AND METHOD FOR IDENTIFYING CONNECTIONS IN AN INDUSTRIAL ENCLOSURE

(71) Applicant: Rockwell Automation Technologies, Inc., Mayfield Heights, OH (US)

(72) Inventors: Ahmad K. Omari, Bayside, WI (US); Justin M. Lemminger, Milwaukee, WI (US); Jeffrey A. Kilburn, Hartland, WI (US); Kou K. Vang, Brown Deer, WI (US); Sheila A. Quinnies, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 26 days.

(21) Appl. No.: 14/291,824

(22) Filed: May 30, 2014

(65) Prior Publication Data

US 2015/0349450 A1    Dec. 3, 2015

(51) Int. Cl.
*H01R 13/00* (2006.01)
*H01R 13/46* (2006.01)
*H01R 13/645* (2006.01)

(52) U.S. Cl.
CPC .......... *H01R 13/465* (2013.01); *H01R 13/6456* (2013.01)

(58) Field of Classification Search
CPC ............. H01R 13/465; H01R 13/6456; H01R 13/4367; H01R 13/6461; H01R 43/28; H01R 24/64
USPC ....................................................... 439/491
See application file for complete search history.

(56) References Cited

U.S. PATENT DOCUMENTS

| 5,775,935 | A | 7/1998 | Barna | |
|---|---|---|---|---|
| 5,885,111 | A * | 3/1999 | Yu | H01R 24/64 439/676 |
| 5,941,734 | A * | 8/1999 | Ikeda | H01R 13/6461 439/676 |
| 6,161,278 | A * | 12/2000 | Easter | H01R 43/28 29/566.4 |
| 6,923,675 | B2 | 8/2005 | Gorin | |
| 7,410,386 | B2 * | 8/2008 | Fabian | H01R 13/4367 439/441 |
| 8,615,873 | B2 | 12/2013 | Shimirak | |
| 2001/0041476 | A1 | 11/2001 | Sato et al. | |

OTHER PUBLICATIONS

Schneider Electric, The Essential Guide, Instakits, IEC enclosed starters, Jun. 2010 (28 pages).
Rockwell Automation, Product Profile, IEC Quick Connect Starter, Nov. 2006 (2 pages).
Extended European Search Report dated Aug. 10, 2015: European Patent Application No. 15169450.2—6 pages.

* cited by examiner

*Primary Examiner* — Jean F Duverne
(74) *Attorney, Agent, or Firm* — Boyle Fredrickson, S.C.

(57) ABSTRACT

The subject matter disclosed herein describes a system for connecting devices mounted to and within an industrial enclosure. The conductors for a device having multiple electrical conductors are bundled together. A first color coded element, such as a sleeve, is slid over the bundle providing a first identifier. The ends of the conductors are terminated at a single plug for insertion into a receptacle. A second color coded element, such as a label, which corresponds to the first color coded element, identifies into which receptacle each plug is to be inserted. In addition, each pole of the plug and/or receptacle includes a key or a corresponding space to receive a key. Various combinations of keys and spaces are defined such that each plug may be inserted into a single receptacle.

20 Claims, 6 Drawing Sheets

SYSTEM AND METHOD FOR IDENTIFYING CONNECTIONS IN AN INDUSTRIAL ENCLOSURE

BACKGROUND OF THE INVENTION

The subject matter disclosed herein relates generally to a system for identifying connections between devices in an industrial enclosure and, more specifically, to a system for providing a color-coded connection between the devices.

Industrial automation is increasingly being used to improve efficiency and increase throughput in manufacturing and other manual labor related operations. The automation may include, for example, a motor controlling an axis of motion on a machine, a conveyor to move objects between locations, and/or drive a tool used in a process. Although some operations may be fully automated and controlled, for example, by a programmable logic controller (PLC), other tasks may require some operator interaction due, for example, to infrequent or unscheduled operation. The operator may be required to start and stop operation or monitor an operating condition of the motor or controlled object.

Industrial enclosures provide a housing in which the controls for the motor may be housed. Knockouts in the enclosure allow power to be run into the enclosure. Operator interface devices, such as switches or buttons, which may receive input from the operator, or lamps or other devices, which may provide a visual indication to the operator, may be mounted to the front surface of the housing. Connections between the power input, the operator interface devices, and controlled devices may be made internal to the housing. The connections may be made directly or via additional devices, such as a transformer, relay, or protective device.

As is known to those skilled in the art, industrial enclosures may be customized in many varying configurations to perform many different functions according to an application's requirements. The industrial enclosure may include, for example, various combinations of operator accessible devices, such as start/stop pushbuttons, emergency stop button, selector switches, and the like and various combinations of internal devices, such as contactors, terminal blocks, relays, and the like. Connections between the operator accessible devices and the internal devices typically require two or more electrical conductors, or wires, for each device and separate wires are provided for each electrical connection. As the number of devices and the complexity of the enclosure increases, so does the wiring required to establish electrical connections between each of the devices. The required time and expense to assemble the enclosures similarly increases.

As is also known, a color coding scheme exists for the color of the insulation selected for each of the wires. The color is selected according to the type of voltage and/or function of the wire. For example, a wire carrying a continuous AC voltage at the supply voltage is black while a wire carrying a switched, or controlled, AC voltage at the supply voltage is red. A wire carrying a DC voltage is blue and a wire carrying AC from another source, such that it may remain hot when the enclosure itself is disconnected from power, is yellow. However, it is not uncommon that many of the conductors within the enclosure are the same color. For example, each of the conductors between the operator accessible devices and the internal devices may be red as they carry a switched AC voltage. The potential, therefore, exists that the electrician may miswire conductors between devices resulting in damage to the devices in the enclosure and/or unexpected operation and/or damage to the controlled device.

Thus, it would be desirable to provide an improved system for connecting devices within an industrial enclosure.

BRIEF DESCRIPTION OF THE INVENTION

The subject matter disclosed herein describes a system for connecting devices mounted to and within an industrial enclosure. The conductors for a device having multiple electrical conductors are bundled together. A first color coded element, such as a sleeve, is slid over the bundle providing a first identifier. The ends of the conductors are terminated at a single plug for insertion into a receptacle. A second color coded element, such as a label, which corresponds to the first color coded element, identifies into which receptacle each plug is to be inserted. In addition, each pole of the plug and/or receptacle includes a key or a corresponding space to receive a key. Various combinations of keys and spaces are defined such that each plug may be inserted into a single receptacle.

According to one embodiment of the invention, an interconnection system for an industrial enclosure is disclosed. The industrial enclosure includes multiple externally accessible electronic devices and multiple internally mounted electronic devices. The interconnection system includes multiple electrical conductors, plugs, terminal blocks, first color coded elements, and second color coded elements. The electrical conductors each have a first end and a second end, where the first end of each electrical conductor is electrically connected to one of the externally accessible electronic devices. Each plug has multiple terminals and a mating portion. Each of the terminals is configured to receive the second end of one of the electrical conductors. Each terminal block has a first terminal and a second terminal electrically connected to the first terminal. The first terminal is configured to engage the mating portion of one of the plugs, and the second terminal is electrically connected to one of the internally mounted electronic devices. Each of the first color coded elements identifies a portion of the electrical conductors connected between one of the externally accessible electronic devices and one of the plugs, and each of the second color coded elements identifies a portion of the terminal blocks. Each of the second color coded elements corresponds to one of the first color coded elements, where the color coded elements provide a visual indication of which of the first terminals on the terminal blocks the mating portion of each plug engages.

According to another embodiment of the invention, an interconnection system for an industrial enclosure is disclosed. The industrial enclosure includes multiple interconnected electronic devices. The interconnection system includes multiple electrical conductors, plugs, receptacles, first color coded elements, and second color coded elements. Each electrical conductor has a first end and a second end, where the first end of each electrical conductor is electrically connected to a first electronic device. Each plug has multiple terminals and a mating portion, where each of the terminals is configured to receive the second end of one of the electrical conductors. Each receptacle is configured to receive the mating portion of one of the plugs and is electrically connected to a second electronic device. Each of the first color coded elements identifies one of the plugs, and each of the second color coded elements identifies one of the receptacles. Each of the second color coded elements corresponds to one of the first color coded elements, providing a visual indication of which receptacle each plug engages.

According to still another embodiment of the invention, a method of identifying interconnections in an industrial enclosure is disclosed. The industrial enclosure has a plurality of interconnected electronic devices within the enclosure. A first end of each conductor of a first set of electrical conductors is connected to a first electronic device. A first color coded sleeve is applied to the first set of electrical conductors, where the first color coded sleeve has a first color. A first plug is connected to a second end of each conductor of the first set of electrical conductors, and a first color coded label is applied to a first receptacle, where the first color coded label is the first color. A first end of each conductor of a second set of electrical conductors is connected to a second electronic device. A second color coded sleeve is applied to the second set of electrical conductors, where the second color coded sleeve has a second color. A second plug is connected to a second end of each conductor of the second set of electrical conductors, and a second color coded label is applied to a second receptacle, where the second color coded label is the second color. The first color and the second color identify which plug is connected to which receptacle.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
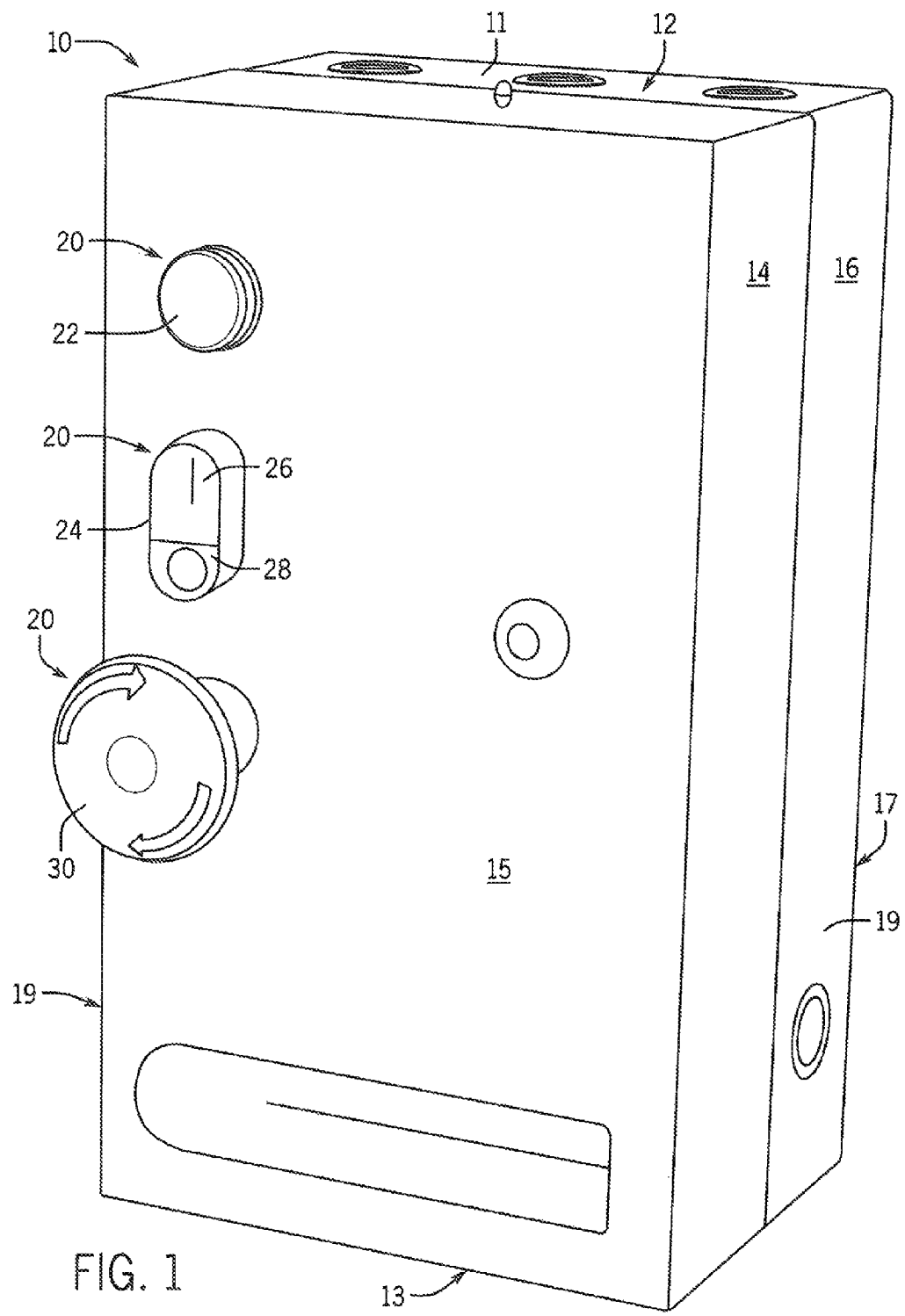
FIG. 1 is an isometric view of an industrial enclosure incorporating one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Turning initially to FIG. 1, an industrial enclosure 10 has a housing 12 having a top 11, bottom 13, front 15, rear 17, and side 19 surfaces. It is understood that the use of terms such as top, bottom, front, rear, and side are used to identify surfaces of the housing 12 and to denote understood relationships with each other. The terms are not intended to identify a particular orientation of the housing 12 as the housing 12 may be rotated about any axis and located in any orientation without deviating from the scope of the invention. According to the illustrated embodiment, the housing 12 includes a removable cover 14 and a base 16. The removable cover 14 provides access to the inside of the housing 12 and to devices mounted within the housing 12. Optionally, the housing 12 may include, for example, a hinged door or removable panel to provide access to the inside of the housing 12. Still other configurations of the housing may be utilized without deviating from the scope of the invention.

The housing 12 includes a number of externally accessible electronic devices 20 mounted to the front surface 15 of the housing 12. According to the illustrated embodiment, the externally accessible electronic devices 20 include an indicator lamp 22, a start/stop switch 24, having a first button 26, which is pressed to start a device, and a second button 28, which is pressed to stop the device, and an emergency stop pushbutton 30. The externally accessible electronic devices 20 provide an interface to an operator. Devices such as switches, pushbuttons, dials, and the like may be mounted to the housing 12 to receive input from the operator, and devices such as lamps, displays, speakers, and the like may be mounted to the housing 12 to provide audio or visual indications to the operator. It is contemplated that numerous combinations and configurations of devices may be provided on various surfaces of the housing 12 according to an application's requirements without deviating from the scope of the invention.

Figure 2:
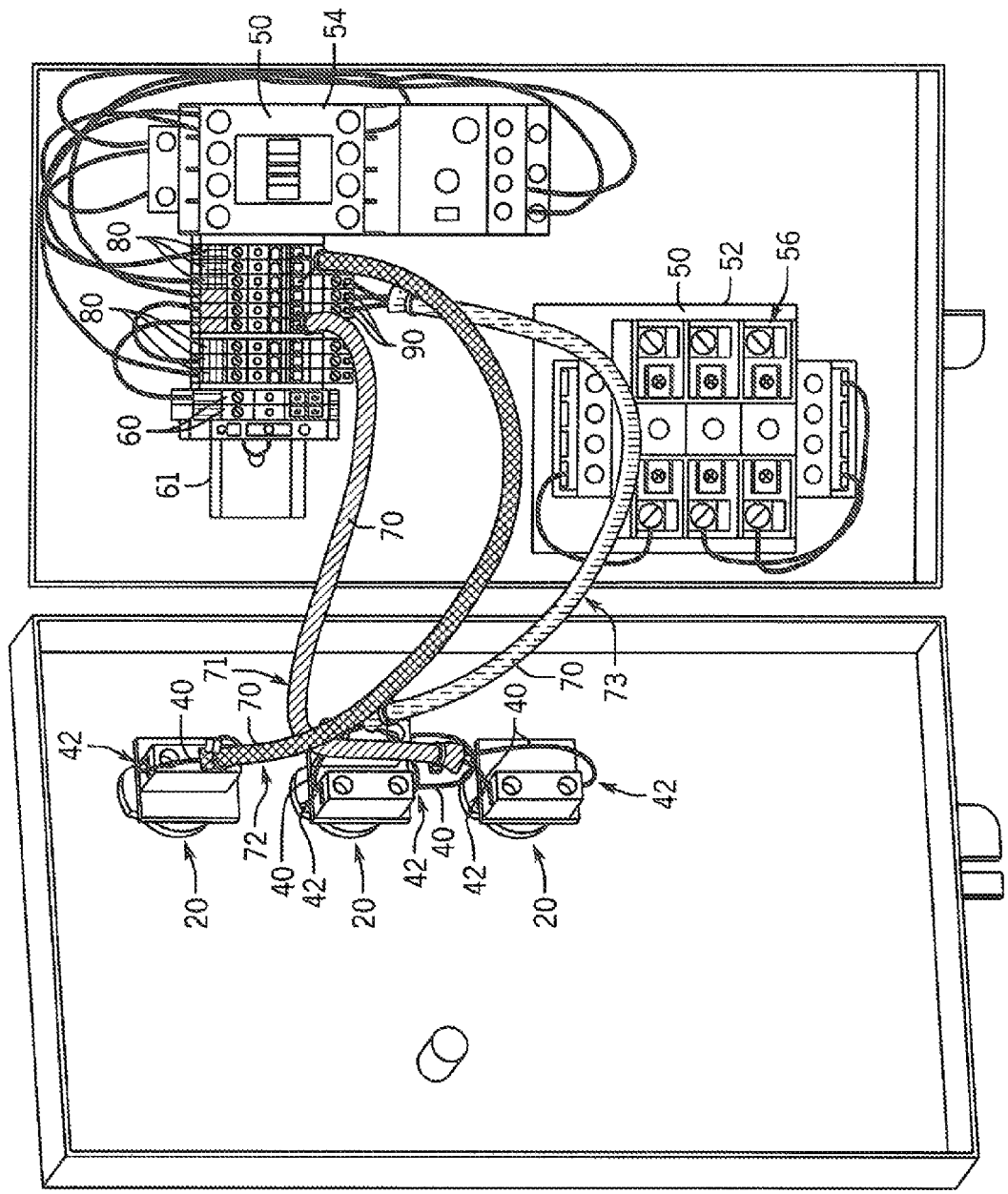
FIG. 2 is an isometric view of the inside of the industrial enclosure of FIG. 1 with the cover removed from the base.

Turning next to FIG. 2, the industrial enclosure 10 is illustrated with the cover 14 removed from and standing next to the base 16 such that the interior of the industrial enclosure 10 is visible. A close-up view of a portion of the interior of the industrial enclosure 10 is visible in FIG. 3. The back side of each of the externally accessible electronic devices 20 is visible and extends through the front surface 15 of the housing 12 such that electrical connections to each of the externally accessible electronic devices 20 is made within the industrial enclosure 10. The interior of the industrial enclosure 10 also has multiple internally mounted electronic devices 50 contained therein. According to the illustrated embodiment, one of the internally mounted electronic devices 50 is a transformer 52. The transformer is configured to receive a voltage at a first level at input terminals and provide a voltage at a second level at the output terminals. For example, a 230 or 460 VAC voltage may be supplied to the industrial enclosure 10 and connected to the input terminals of the transformer 52, and a 110 VAC voltage may be provided at the output terminals of the transformer to operate the contactor 54 and/or the indicator lamp 22. An integral protective block 56, including fuses, is mounted to the illustrated transformer 52. Optionally, the protective block 56 may be provided and mounted separately from the transformer 52 and/or include a circuit breaker or a combination of fuses and circuit breakers. Another of the internally mounted electronic devices 50 is a contactor 54 which may be energized or de-energized by the connecting the 110 VAC voltage from the output of the transformer 52 to the appropriate terminals of the contactor 54.

According to the illustrated enclosure 10, the start button 26 is pressed to activate a device such as a motor. When the start button 26 is pressed, the start/stop switch 24 establishes an electrical connection between the 110 VAC voltage from the transformer 52 and a solenoid internal to the contactor 54. The solenoid is energized, closing the relay in the contactor 54 and establishing an electrical connection between the power input to and the device controlled by the industrial enclosure 10, thereby causing the controlled device to operate. The indicator lamp 22 may be connected to normally open contacts of the contactor 54, such that the lamp 2 turns on when the contactor 54 is energized. The circuit is maintained, keeping the controlled device operational, until either the stop button 28 or the emergency stop button 30 is pressed. The stop button 28 may initiate, for example, a controlled shut down of the controlled device, and the emergency stop button 30 may immediately remove power from the controlled device and further set a brake, insert a pin, or, by any other suitable method, cause the controlled device to come to an immediate stop.

Electrical conductors 40 are provided within the industrial enclosure 10 to connect the electrical devices for operation according to an application's requirement. According to the illustrated embodiment, each of the externally accessible electronic devices 20 has a first end 42 of either two or three conductors 40 connected. Optionally, various other numbers of conductors 40 may be connected to each of the externally accessible electronic devices 20 according to the requirements of the device 20. The conductors 40 are of sufficient length to span between the cover 14 and the internally mounted devices 50 when the cover 14 is removed from the base 16. A second end 44 of each of the conductors 40 is connected to the internally mounted devices 50.

As previously discussed, individual conductors 40 were typically connected from each of the externally accessible electronic devices 20 directly to either the internally mounted devices 50 or to one of the terminal blocks 60. As shown in the illustrated embodiment of the invention in FIGS. 2-4, an improved system for connecting devices within the enclosure 10 is disclosed. Each of the conductors 40 for one of the externally accessible electronic devices 20 is bundled into a single group. According to the illustrated embodiment, a sleeve 70, for example, a braided sheath, is provided that slides over each of the conductors 40 for one of the devices. A cable tie 75 holds each end of the sleeve 70 to hold it in place on the set of conductors 40. The sleeve 70 extends along a majority of the length of the conductors 40 leaving enough length of each end 42, 44 of the conductor extending from the sleeve 70 to be connected to a device 20, 50 or to a plug 90. Optionally, the sleeve 70 may be a wire loom, wire wrap, or other suitable outer jacket or material to hold the conductors 40 together in a group. The first end 42 of each conductor 40 within one of the sleeves 70 is electrically connected to one of the externally accessible electronic devices 50. The second end 44 of each conductor 40 within one of the sleeves 70 is electrically connected to a plug 90.

Figure 4:
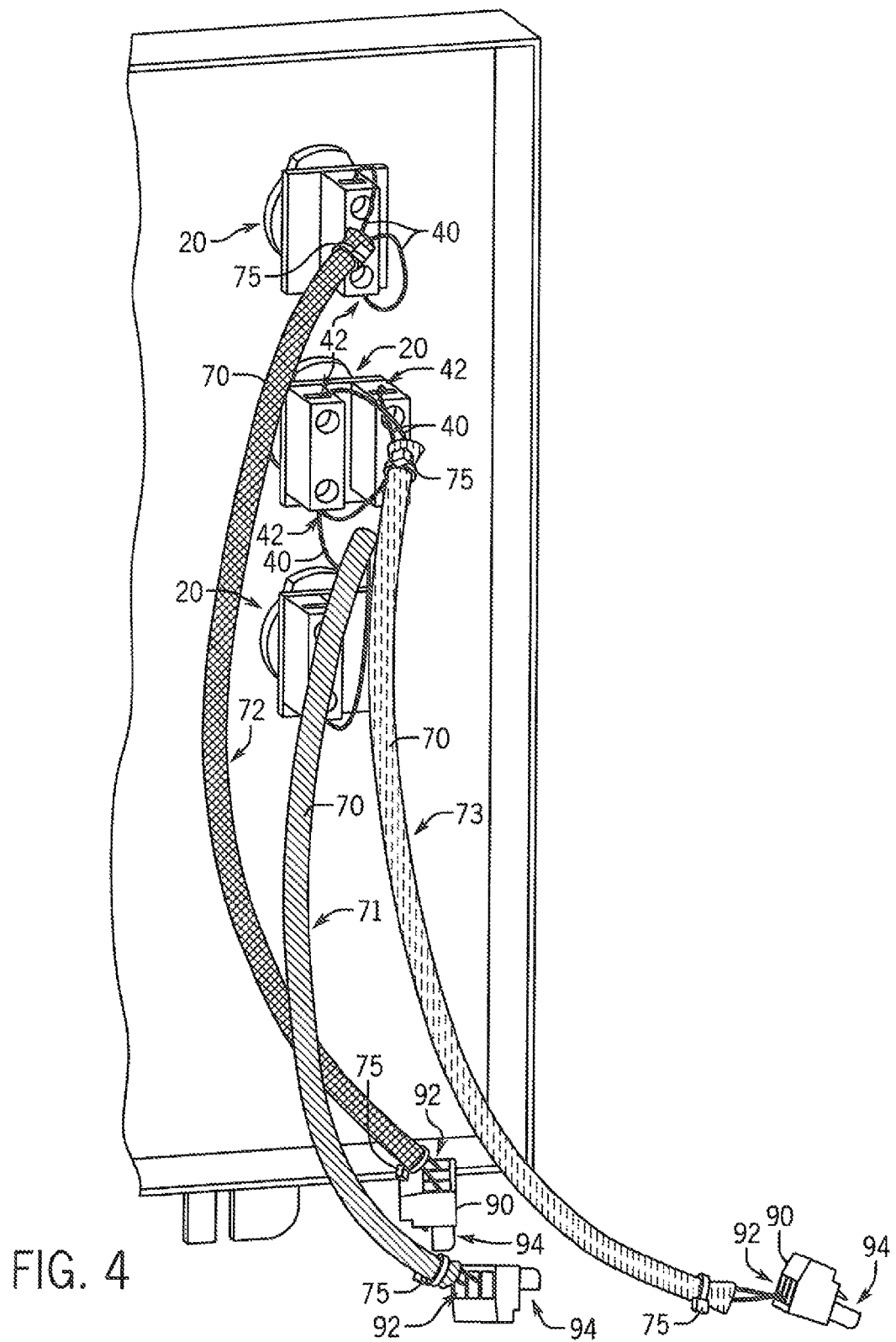
FIG. 4 is a partial isometric view of color coded sleeves utilized in the industrial enclosure of FIG. 1.
Figure 11:
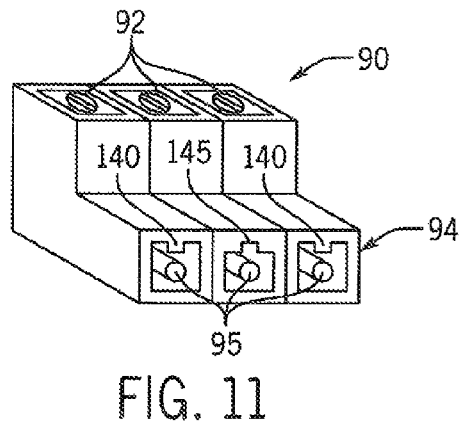
FIG. 11 is an isometric view of a plug configured to receive the conductors within one of the color-coded sleeves.
Figure 12:
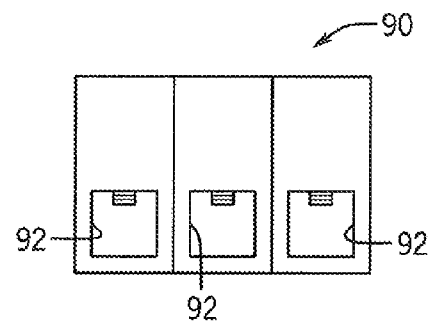
FIG. 12 is a rear elevation view of the plug of FIG. 11.
Figure 13:
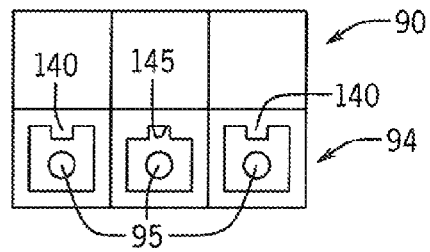
FIG. 13 is a front elevation view of the plug of FIG. 11.

With reference also to FIGS. 4 and 11, each plug 90 includes a terminal connection 92 and a mating portion 94. According to the illustrated embodiment, the terminal connection 92 includes a screw connection to secure the second end 44 of a conductor 40 within the plug 90. Optionally, a spring-clamp or other type of terminal connection may be used without deviating from the scope of the invention. The mating portion 94 is illustrated with a male plug 95 configured to plug into a corresponding female receptacle 63 on the terminal block 60. The plug 90 may include the same number of poles as conductors 40 being inserted into terminal connections 92 or, optionally, the plug 90 may include additional poles in which no conductor 40 is inserted.

Figure 14:
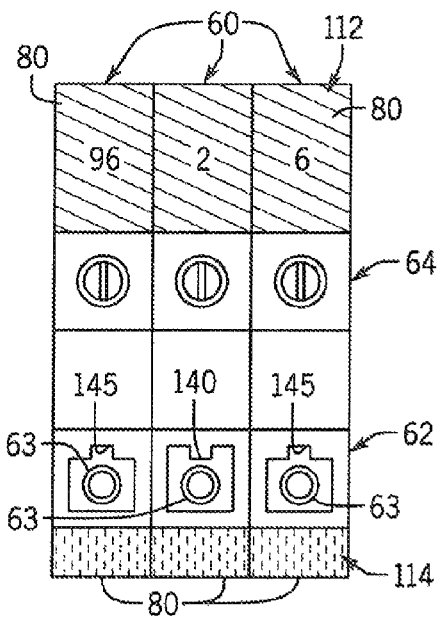
FIG. 14 is a top plan view of a set of terminal blocks configured to receive the plug of FIG. 11.
Figure 15:
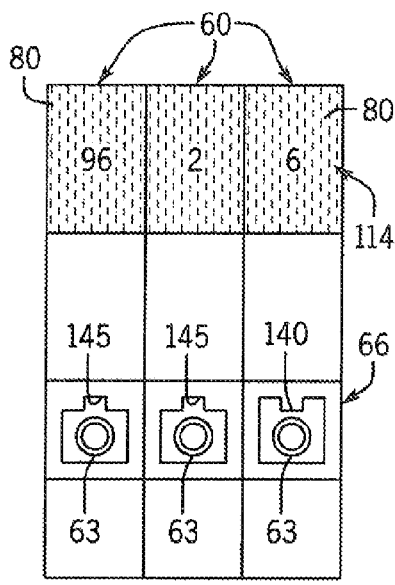
FIG. 15 is a front elevation view of the set of terminal blocks of FIG. 14.

Terminal blocks 60 are mounted within the enclosure 10, for example, on rail 61 and configured to receive each of the plugs 90. With reference also to FIGS. 14 and 15, each of the illustrated terminal blocks 60 includes multiple terminals. According to the illustrated embodiment, one of the terminals is a screw terminal 64. The screw terminal is configured to receive an electrical conductor connected to one of the internally mounted devices 50. Optionally the terminal may be a spring-clamp terminal or other type of terminal configured to receive an electrical conductor. Each terminal block 60 also includes a terminal configured as a receptacle to receive a mating portion 94 of the plug 90. The illustrated terminal block 60 includes a top receptacle 62 and a bottom receptacle 66. It is contemplated that the terminal block 60 may include various other combinations and numbers of terminals configured to receive conductors or receptacles without deviating from the scope of the invention.

A number of terminal blocks 60 equal to the number of poles of the plug 90 are arranged adjacent to each other to receive the mating portion 94 of the plug 90. A first plug 90 may be inserted into the top receptacle 62 and a second plug 90 may be inserted into the bottom receptacle 66. It is contemplated that the externally accessible device 20, conductors 40, sleeve 70, and plug 90 may be provided as a single component for easier installation into the enclosure 10. Optionally, various lengths of the conductors 40, sleeve 70, and plug 90 may be provided to establish connection between the externally accessible device 50 and the terminal block. According to still another option, the externally accessible device 50 may be installed in the housing 12 with the conductor 40, sleeve 70, and plug 90 each sequentially installed. In any event, once the plug 90 has been connected to the externally accessible device 50, the potential for wiring error between the externally accessible device 50 and the terminals 60 is significantly reduced. As discussed below, the additional color coding system and keying system of the present invention can eliminate the opportunity to incorrectly connect the plug 90 to the terminals 60.

Figures 5, 6, 7, 8, 9, 10:
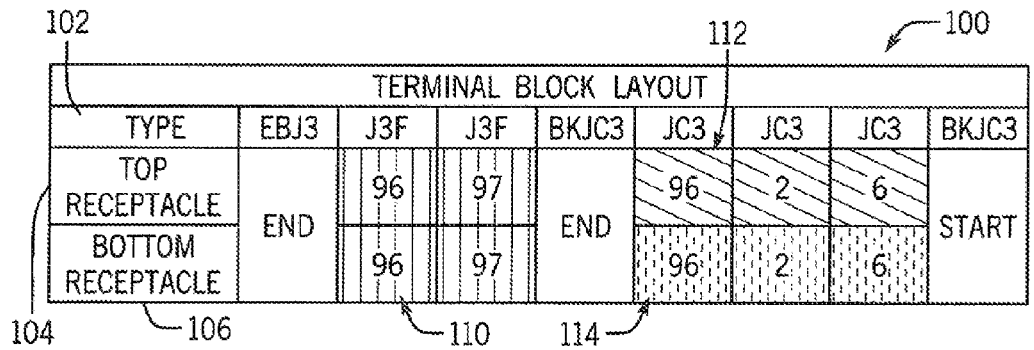
FIG. 5 is a table illustrating the connections and layout of color coded labels for a terminal block according to one embodiment of the invention.
FIG. 6 is a table illustrating the connections of a plug connected to conductors within a color coded sleeve corresponding to the layout of FIG. 5.
FIG. 7 is a table illustrating the connections of a plug connected to conductors within a color coded sleeve corresponding to the layout of FIG. 5
FIG. 8 is a table illustrating the layout of key elements in the terminal blocks of FIG. 5.
FIG. 9 is a table illustrating the layout of key elements of a plug for one of the color coded sleeves inserted into a corresponding section of the terminal block of FIG. 8.
FIG. 10 is a table illustrating the layout of key elements of a plug for one of the color coded sleeves inserted into a corresponding section of the terminal block of FIG. 8.

With reference next to FIGS. 5-7, a color coding system, according to one embodiment of the invention is illustrated, which provides for easier connection of the externally accessible electronic devices 20 to the terminal blocks 60. A terminal block layout chart 100 defines the color coding for each of the terminal blocks 60. A first row 102 of the terminal block layout chart 100 identifies the type and location of each terminal block to be installed in the enclosure 10. A second row 104 of the terminal block layout chart 100 identifies a color associated with, as well as an identifier of the conductor 40 to be connected to, the top receptacle 62 of the terminal block 60, and a third row 106 of the terminal block layout chart 100 identifies a color associated with, as well as an identifier of the conductor 40 to be connected to, the bottom receptacle 66 of the terminal block 60.

A plug layout chart 120 similarly defines the color coding for each plug 90. A first row 122 of the plug layout chart 120 identifies the color of each sleeve 70 covering the conductors 40 connected to that plug 90. A second row 124 of the plug layout chart 120 identifies the pole of each plug 90. The third row 126 and the further row 128 of the plug layout chart 120 include identifiers of the conductor 40 connected to the corresponding pole of each plug 90.

Color coded elements are provided on the conductors 40 and on the terminal blocks 60 according to the plug layout chart 120 and the terminal block layout chart 100 to identify which plug 90 is connected to which terminal blocks 60. A first color-coded element is the sleeve 70 surrounding the bundle of conductors 40 and a second color-coded element is a label 80 placed on the terminal block 60. The set of conductors 40, connected at one end to a device 20 or 50, are identified by the colored sleeve 70 and connected, at the second end 44 to a plug 90. Colored labels 80 are placed on each terminal block 60 corresponding to the color of the sleeve 70 over the conductors 40 which are to be plugged into the terminal blocks 60. The label 80 may provide an indication only of the color or, as illustrated, the label 80 may also provide the identifier of the conductor 40 to be connected to the terminal block 60. The plug 90 is inserted into either the top receptacle 62 or the bottom receptacle 66 as identified by the label 80 having the color which matches the color of the sleeve 70.

Figure 3:
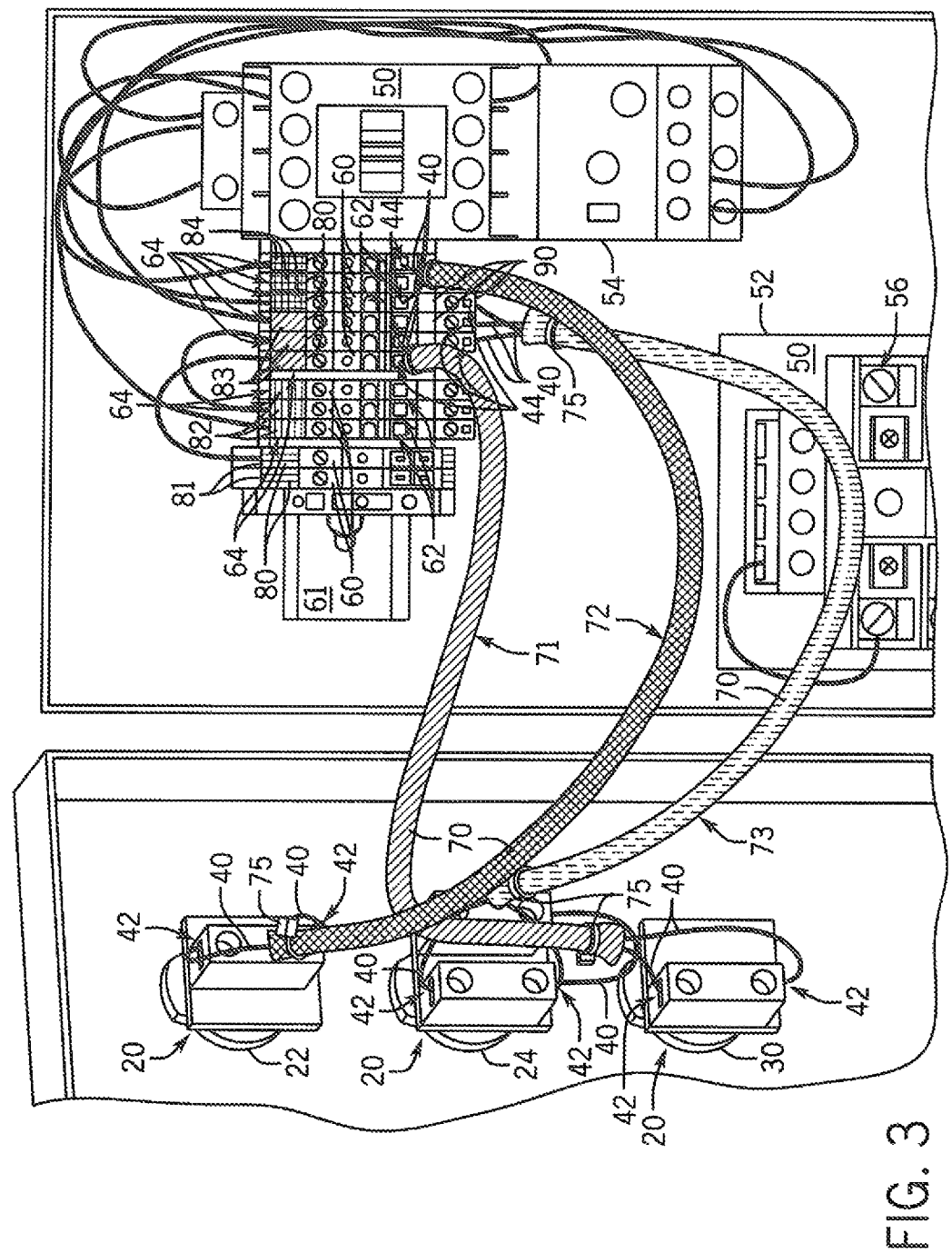
FIG. 3 is a partial isometric view of the inside of the industrial enclosure of FIG. 1 showing the identification system according to one embodiment of the present invention.

According to the illustrated embodiment, a first color 110 is provided on both the top receptacle 62 and the bottom receptacle 66 of the J3F-type terminals 60. The first color 110 may be defined as red and may be used to identify a connection to the transformer 52 in the enclosure 10. Although not shown, a sleeve 70 and plug 90 may be used to identify connections between two internally mounted devices 50 as well as between an externally accessible device 20 and an internally mounted device 50 as shown in FIGS. 2-4. A second color 112 may be defined as green and used to identify a connection to the Emergency Stop button 30. A third color 114 may be defined as purple and used to identify a connection to an Emergency Stop light (not shown). Labels 80 are affixed to the terminal blocks 60 to indicate that the second color 112 is received in the top receptacle 62 of the JC3-type terminals 60 and the third color 114 is received in the bottom receptacle 66 of the JC3-type terminals 60.

Providing color-coded bundles of conductors allows the location at which each plug is to be inserted readily identified and easily accomplished. In addition, the color-coding on the bundles of conductors is independent of the function and/or voltage conducted by the device 20 or 50 to which the bundle is connected. It is contemplated that a color may be associated with a device, for example, an orange sleeve may be associated with lamps and a purple sleeve may be associated with a switch. However, the switch and lamp may run on AC or DC voltage and the insulation of the conductors 40 internal to bundle may vary accordingly while the color of the sleeves 70 remains the same. Further, the ends of each conductor 40 are exposed a sufficient length for termination of the conductor 40 which allows personnel accessing the enclosure 10 to readily identify both the color coding of the insulation of the conductors 40 as well as the color coding on the bundle of conductors 40. Although the illustrated sleeve 70 is a braided sheath, it is further contemplated that the sleeve 70 may be, for example, a wire loom or other suitable wrap around the bundle of conductors 40 without deviating from the scope of the invention.

Because some personnel may be color-blind, it is further contemplated that, according to another aspect of the invention, a graphical indicator is associated with each color. For example, a square may be associated with the first color 110, a circle associated with the second color 112, and a triangle associated with the third color 114. The graphical indicator may be printed on the sleeve 70, for example, at the plug end or in a repetitive manner along the sleeve 70 and on the label 80 to provide a secondary coding method to correspond each plug 90 with the terminal blocks 60 to which it is to be inserted.

Providing the color coding scheme and/or the associated graphical indicator may decrease assembly time as well as reduce the potential for wiring errors. However, if multiple sleeves 70 of one color having plugs 90 with the same number of poles exist within one enclosure 10, the potential still exists that plugs may be inserted into incorrect receptacles. It is, therefore, another aspect of the invention, that the plugs 90 and the receptacles of the terminal blocks are keyed, such that each plug 90 may be inserted into only one location on the terminal blocks 60. A key 140 may be inserted either into one or more of the poles in the mating portion 94 of the plug 90 or into the receptacle 62 or 66 on the terminal block 60. The corresponding receptacle 62 or 66 or pole has a space 145 configured to receive the key 140. The combinations of keys 140 and spaces 145 for each plug 90 can be configured such that only one plug 90 fits into a set of terminal blocks 60.

Referring next to FIGS. 8-10, a terminal block keying chart 150 may be provided to identify which of the receptacles 62 or 66 of each terminal block 60 includes a key 140. A first row 152 of the terminal block keying chart 150 identifies the marker shown on the label 80 for the upper receptacle 62 of each terminal block 60. The marker includes the color and/or the identifier of the conductor 40 as shown in the terminal block layout chart 100. The second row 154 of the terminal block keying chart 150 then indicates whether the upper receptacle 62 receiving that conductor 40 includes a key 140. A third row 156 of the terminal block keying chart 150 identifies the marker shown on the label 80 for the lower receptacle 66 of each terminal block 60. The marker includes the color and/or the identifier of the conductor 40 as shown in the terminal block layout chart 100. The fourth row 158 of the terminal block keying chart 150 then indicates whether the lower receptacle 66 receiving that conductor 40 includes a key 140.

According to one embodiment of the invention, each of the upper receptacle 62 and the lower receptacle 66 are configurable where a key 140 may be inserted and/or removed from the receptacle. The receptacle may include, for example, three slots equally dividing an upper portion of the receptacle. An insert may be placed in the center slot to define the key 140 and two inserts may be placed, one in each of the outer two slots, to define the space 145. Optionally, the terminal block 60 may be molded such that the key 140 and/or the space 145 are integrally formed in the housing of the terminal block 60. Still other configurations of mechanical keys may be utilized without deviating from the scope of the invention.

A plug keying chart 160 similarly defines the key configuration for each plug 90. A first row 162 of the plug layout chart 120 identifies the color of each sleeve 70 covering the conductors 40 connected to that plug 90, corresponding to the plug layout chart 120. The second row 164 of the plug keying chart 160 identifies each pole of the plug 90, and the third row 166 of the plug keying chart 160 indicates whether that pole of the plug 90 includes a key 140. The key 140 and/or space 145 are complementary to the key 140 and/or space 145 of the receptacles 62 or 66 in the terminal block 60 such that each pole of the plug may engage one of the receptacles 62 or 66 of the terminal block 60.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An interconnection system for an industrial enclosure, wherein the industrial enclosure includes a plurality of externally accessible electronic devices and a plurality of internally mounted electronic devices, the interconnection system comprising:
    a plurality of electrical conductors having a first end and a second end, wherein the first end of each electrical conductor is electrically connected to one of the externally accessible electronic devices;
    a plurality of plugs, each plug having a plurality of terminals and a mating portion, wherein each of the plurality of terminals is configured to receive the second end of one of the electrical conductors;
    a plurality of terminal blocks, each terminal block having a first terminal and a second terminal electrically connected to the first terminal, wherein the first terminal is configured to engage the mating portion of one of the plugs and the second terminal is electrically connected to one of the internally mounted electronic devices;
    a plurality of first color coded elements, wherein each of the first color coded elements identifies a portion of the plurality of electrical conductors connected between one of the externally accessible electronic devices and one of the plurality of plugs; and
    a plurality of second color coded elements, wherein each of the second color coded elements identifies a portion of the terminal blocks and wherein each of the second color coded elements corresponds to one of the first color coded elements providing a visual indication of which of the first terminals on the terminal blocks the mating portion of each plug engages.

2. The interconnection system of claim 1 wherein each of the plurality of electrical conductors further includes insulation having a color, wherein the color of the insulation is different than the color of the first and the second color coded elements.

3. The interconnection system of claim 2 wherein the color of the insulation is selected according to a first color coding system and the color of the first and second color coded elements is selected according to a second color coding system.

4. The interconnection system of claim 1 wherein the first color coded element is selected from one of a wire sleeve and a wire loom.

5. The interconnection system of claim 1 wherein the second color coded element is a label affixed to each terminal block.

6. The interconnection system of claim 1 further comprising:
    a plurality of first graphical indicators; and
    a plurality of second graphical indicators, wherein each of the second graphical indicators corresponds to one of the first graphical indicators and wherein a corresponding first and second graphical indicator are applied to a corresponding first and second color coded element.

7. The interconnection system of claim 1 wherein the mating portion of each of the plugs includes a keyed portion configured to engage a predefined portion of the first terminals of the terminal blocks.

8. A method of identifying interconnections in an industrial enclosure, wherein the industrial enclosure has a plurality of interconnected electronic devices within the enclosure, the method comprising the steps of:
    connecting a first end of each conductor of a first set of electrical conductors to a first electronic device;
    applying a first color coded sleeve to the first set of electrical conductors, wherein the first color coded sleeve has a first color;
    connecting a first plug to a second end of each conductor of the first set of electrical conductors;
    applying a first color coded label to a first receptacle, wherein the first color coded label is the first color;
    connecting a first end of each conductor of a second set of electrical conductors to a second electronic device;
    applying a second color coded sleeve to the second set of electrical conductors, wherein the second color coded sleeve has a second color;
    connecting a second plug to a second end of each conductor of the second set of electrical conductors; and
    applying a second color coded label to a second receptacle, wherein the second color coded label is the second color, wherein the first color and the second color identify which plug is connected to which receptacle.

9. The method of claim 8 wherein each conductor of the first and second sets of electrical conductors has a color and wherein the color of the insulation is different than the first and the second colors.

10. The method of claim 9 wherein the color of the insulation is selected according to a first color coding system and the first and the second colors are selected according to a second color coding system.

11. The method of claim 8 wherein the first color coded sleeve and the first color coded label include a first graphical indicator and the second color coded sleeve and the second color coded label include a second graphical indicator.

12. The method of claim 8 wherein at least one of each plug and each receptacle includes a keyed portion configured to engage a predefined portion of the corresponding plug or receptacle.

13. An interconnection system for an industrial enclosure, wherein the industrial enclosure includes a plurality of interconnected electronic devices, the interconnection system comprising:
    a plurality of electrical conductors having a first end and a second end, wherein the first end of each electrical conductor is electrically connected to a first electronic device;
    a plurality of plugs, each plug having a plurality of terminals and a mating portion, wherein each of the plurality of terminals is configured to receive the second end of one of the electrical conductors;
    a plurality of receptacles, each receptacle configured to receive the mating portion of one of the plugs and electrically connected to a second electronic device;

a plurality of first color coded elements, wherein each of the first color coded elements identifies one of the plugs; and a plurality of second color coded elements, wherein each of the second color coded elements identifies one of the receptacles and wherein each of the second color coded elements corresponds to one of the first color coded elements providing a visual indication of which receptacle each plug engages.

14. The interconnection system of claim 13 further comprising a plurality of terminal blocks, each terminal block having a first terminal and a second terminal electrically connected to the first terminal, wherein the first terminal is one of the receptacles and the second terminal is electrically connected to the second electronic device.

15. The interconnection system of claim 13 wherein each of the plurality of electrical conductors further includes insulation having a color, wherein the color of the insulation is different than the color of the first and the second color coded elements.

16. The interconnection system of claim 15 wherein the color of the insulation is selected according to a first color coding system and the color of the first and second color coded elements is selected according to a second color coding system.

17. The interconnection system of claim 13 wherein the first color coded element is selected from one of a wire sleeve and a wire loom.

18. The interconnection system of claim 13 wherein the second color coded element is a label affixed to each receptacle.

19. The interconnection system of claim 13 further comprising:

a plurality of first graphical indicators; and a plurality of second graphical indicators, wherein each of the second graphical indicators corresponds to one of the first graphical indicators and wherein a corresponding first and second graphical indicator are applied to a corresponding first and second color coded element.

20. The interconnection system of claim 13 wherein the mating portion of each of the plugs includes a keyed portion configured to engage a predefined portion of one of the receptacles.

* * * * *